J. S. COX.
VARIABLE SPEED GEARING.
APPLICATION FILED JUNE 2, 1908.

958,694.

Patented May 17, 1910.

Witnesses
Rudolf Waldenhayn
James T. Bachelor

Inventor
John S. Cox.
By Hazard Shumre
Attorneys.

UNITED STATES PATENT OFFICE.

JOHN S. COX, OF YUMA, ARIZONA TERRITORY.

VARIABLE-SPEED GEARING.

958,694.  Specification of Letters Patent.  Patented May 17, 1910.

Application filed June 2, 1908. Serial No. 436,278.

*To all whom it may concern:*

Be it known that I, JOHN S. Cox, a citizen of the United States, residing at Yuma, in the county of Yuma and Territory of Arizona, have invented new and useful Improvements in Variable-Speed Gearing, of which the following is a specification.

This invention relates to a novel form of frictional variable speed gears and is especially designed for situations where it is desirable to smoothly vary the speed from one point to another without the intervention of any intermediate steps as is usually the case. This is especially desirable in automobile construction and it will be seen from the following description that this gear is peculiarly adapted to automobiles but may be used in any other similar situation.

Frictional change speed gears have heretofore been designed which may be regulated by placing one of the members in a certain position on the other, it being necessary to slide the members against each other.

My invention consists of two members so designed that their relative position to each other may be changed without any, or with very little, slipping of one member over the other, the motion being a rolling one.

Figure 1:
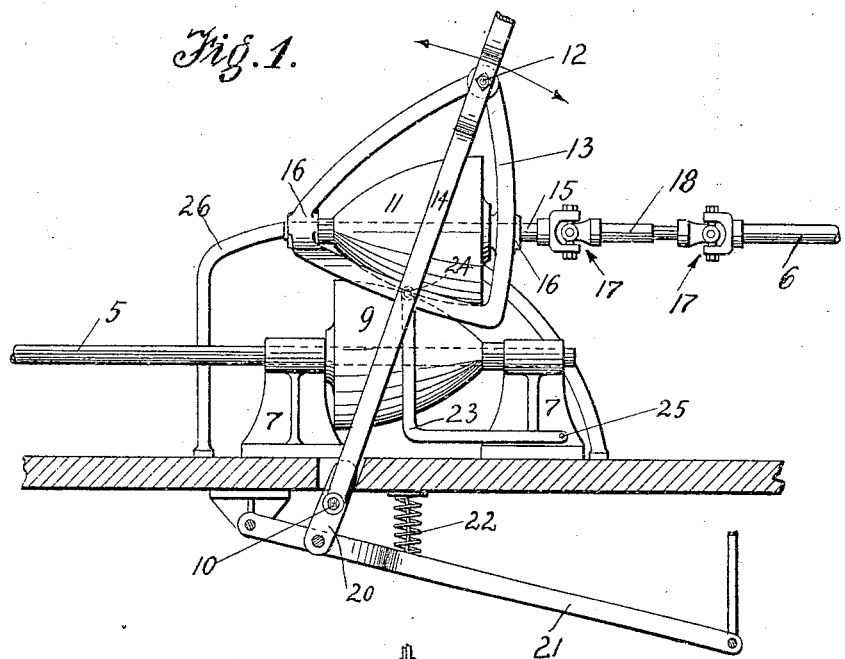
Figure 2:
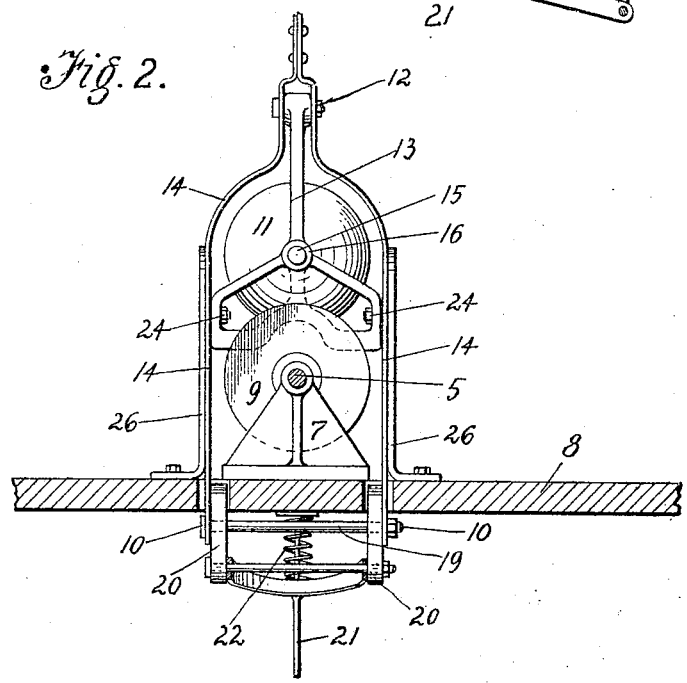

In the accompanying drawings, forming a part of this specification:—Figure 1,— is a side elevation of my improved gear, Fig. 2,— is an end elevation of the same.

In the drawings 5 and 6 designate shafts which will be known as the driving and the driven shafts respectively, and between which my improved gear is adapted to operate. Shaft 5 is carried in stationary bearings 7 mounted on base 8 and is provided with a conical friction wheel or member 9. The center of curvature of the upper curved outline of this member falls at point 10, this point being utilized as a supporting pivot for the structure on which the other member of the gear is mounted. Member 9 is keyed, or otherwise secured, to shaft 5 so as to be rotatively locked thereto. Member 11 is of a configuration similar to that of member 9, the center of curvature of its lower outline being located at the point 12 where its own supporting frame 13 is pivoted to arms 14. Member 11 is turned with its apex in a direction opposite to the corresponding part of member 9 and is rigidly mounted upon a shaft 15 journaled in bearings 16 forming a part of frame 13. Shaft 15 is connected to driven shaft 6 by means of a set of universal joints and an extensible shaft slide 18 between them.

As before noted frame 13 is pivoted at 12 to arms 14, these arms extending on each side of the mechanism to be pivoted at 10 to a transverse pivot stud 19. Pivot stud 19 is mounted on links 20 connected at their ends to a pivoted lever 21. By raising or lowering lever 21 arms 14 and frame 13 carrying member 11 may be moved up and down. A coiled spring 22 normally holds the lever down and holds member 11 in engagement with member 9. The upper ends of arms 14 are extended to be connected to any manipulating mechanism or formed into a handle as is convenient for its operation.

With the mechanism in the position shown it will be noted that members 9 and 11 are in contact with each other at points on their cross-sections of equal diameters so that if shaft 5 is rotated shaft 6 will be frictionally rotated through the members at the same rotative speed. If arms 14 are moved toward the right in Fig. 1 the point of contact will be changed to a section of larger diameter on member 11 and a section of smaller diameter on member 9, and the relative speed of shaft 6 will thereby be decreased. Upon the movement of arm 14 in an opposite direction the relative speed of shaft 6 will be increased.

It will be seen that the two members will always remain in contact with each other as the centers of curvature of their contact lines lie at the points 10 and 12 where they are pivotally supported against each other and also as the sum of the radii is equal to the distance between the pivots 10 and 12. To prevent any accidental slipping and also to provide for throwing the two members out of engagement with each other a pair of rods 23 are pivoted at 24 to frame 13 and at any convenient point, as at 25, to the stationary frame of the gearing. This rod prevents any displacement of the point 24 and thereby holds members 11 and 9 in a fixed relative position. To prevent any side displacement of the two members on account of non-rigidity at pivotal point 10 a pair of guide rods 26 is placed one on each side of arms 14 to guide them in a plane motion.

From the foregoing description my invention will be seen to essentially consist of two frictional engaging members having curved engaging surfaces which may be rolled over each other to change the relative position of the two members. The supporting and other connecting mechanisms may be varied to suit especial conditions to be met with it only being essential that the two members be supported pivotally at the centers of the curvatures of their contacting lines. With this form of gear the change of relative speed of the driven shaft may be smoothly and easily accomplished as there are no steps to be passed through nor friction to be overcome in making the change.

Having described my invention what I claim as new and desire to secure by Letters Patent is:—

1. A speed changing device comprising, a driving member rotating in fixed bearings, a driven member in frictional engagement with said driving member, a pivoted frame, swinging arms to which said pivoted frame is attached, a driven shaft and flexible connecting means between said driven member and the driven shaft.

2. A variable speed gearing, comprising two frictional engaged members, each of said members having an engaging surface whose generating line is an arc of a circle which is revolved about an axis in such relation thereto that the chord subtending said arc forms an acute angle with the axis of revolution, a pivoted frame carrying one of said members and swinging means on which said frame is mounted.

3. A variable speed gearing, comprising two frictionally engaging members each having an engaging surface which is formed by rotating an arc about an axis in such relation thereto that the chord subtending said arc forms an acute angle with said axis of rotation, frames in which said members are rotatably mounted, and a member pivotally connecting said frames in such manner that said engaging surfaces of said frictional members are always in contact when said pivoted member is rocked upon its pivot.

4. A variable speed gearing, comprising a pair of frictionally engaging members having their surfaces curved longitudinally, each of said members being substantially cone shaped and having the apexes of the cones oppositely disposed and means for rotating one of said members about the other in such manner as to change the angular relationship between their respective axes, said means comprising a pivoted frame and a swinging arm for said pivoted frame.

5. A variable speed gearing, comprising two frictionally engaging members, the members having conical engaging surfaces whose generating lines are curved, and means for changing the angle between the rotative axis of said members, said means comprising a pivoted frame carrying one of said frictional engaging members, and a swinging arm for controlling the position of said pivoted frame.

6. In a speed changing device, the combination, of frictionally engaging members formed from sections of oblate spheroids, one of said members being pivoted to contact with the other of said members, in such manner as to maintain the sum of the radii through the contacting point such that it is a constant which is less than the sum of the greatest radii of said members, a driving shaft, a driven shaft, two universal joints, and an extensible telescoping shaft between the two universal joints.

7. A speed changing device comprising, an oblate spheroid driving member, and oblate spheroid driven member, and means whereby said driven member may be rotated about said driving member in such manner as to maintain the two members in frictional contact, a driven shaft and extensible means for connecting the oblate-spheroid driven member with said driven shaft.

8. A variable speed gearing, comprising a pair of frictional engaging members having their surfaces curved longitudinally, each of said members being substantially cone-shaped and having the apexes of the cones oppositely disposed, and means for rotating one of said members about the other in such manner as to change the angular relationship of the cones with respect to the apexes, a driven shaft, two universal joints and an extensible shaft between said universal joints, substantially as described.

9. A speed change device, comprising an oblate spheroid driven member, an oblate spheroid driving member, means whereby said driven member may be rotated about said driving member in such manner as to maintain the two members in frictional contact, said means comprising a swinging frame and pivoted swinging arms to which said frame is attached, substantially as described.

10. A variable speed device, comprising a driven member and a driving member maintained in frictional engagement with each other, and means for mounting said driven member to rotate in an arc about said driving member, said means comprising a swinging frame pivotally mounted in the swinging arms, substantially as described.

In witness that I claim the foregoing I have hereunto subscribed my name this 27th day of May, 1908.

JOHN S. COX.

Witnesses:
JAMES T. BARKELEW,
OLLIE PALMER.